(12) United States Patent
Potts et al.

(10) Patent No.: US 12,548,075 B2
(45) Date of Patent: Feb. 10, 2026

(54) INSTANT ISSUE DEBIT VEHICLE IN A CASINO ENVIRONMENT

(71) Applicants: Craig K. Potts, Scottsdale, AZ (US); Richard Beer, Prior Lake, MN (US)

(72) Inventors: Craig K. Potts, Scottsdale, AZ (US); Richard Beer, Prior Lake, MN (US)

( * ) Notice: Subject to any disclaimer, the term of this patent is extended or adjusted under 35 U.S.C. 154(b) by 0 days.

(21) Appl. No.: 16/412,401

(22) Filed: May 14, 2019

(65) Prior Publication Data

US 2019/0347722 A1 Nov. 14, 2019

Related U.S. Application Data

(60) Provisional application No. 62/671,215, filed on May 14, 2018.

(51) Int. Cl.
| | | |
|---|---|---|
| *G06Q 40/02* | (2023.01) | |
| *G06Q 20/10* | (2012.01) | |
| *G06Q 40/03* | (2023.01) | |

(52) U.S. Cl.
CPC .......... *G06Q 40/03* (2023.01); *G06Q 20/108* (2013.01)

(58) Field of Classification Search
CPC ............ G06Q 20/1085; G06Q 20/108; G06Q 40/025; G06Q 40/02; G06Q 20/10; G06Q 20/18; G06Q 40/03; G07F 17/32
See application file for complete search history.

(56) References Cited

U.S. PATENT DOCUMENTS

| | | | |
|---|---|---|---|
| 10,134,234 B2 | 11/2018 | Lestrange et al. | |
| 10,402,803 B1* | 9/2019 | Prasad | G06Q 20/40 |
| 2005/0288095 A1* | 12/2005 | Walker | G07F 17/3239 |
| | | | 463/25 |
| 2008/0102956 A1* | 5/2008 | Burman | G06Q 20/3224 |
| | | | 463/42 |
| 2008/0113776 A1* | 5/2008 | Sommer | G07F 17/3248 |
| | | | 463/25 |
| 2010/0222132 A1* | 9/2010 | Sanford | G07F 17/3262 |
| | | | 463/25 |
| 2013/0310151 A1* | 11/2013 | Richards | G07F 17/3244 |
| | | | 463/25 |
| 2013/0346283 A1* | 12/2013 | Demarest | G06Q 40/02 |
| | | | 705/38 |
| 2014/0358777 A1* | 12/2014 | Gueh | G06Q 20/1085 |
| | | | 705/43 |

(Continued)

*Primary Examiner* — Scott S Trotter
(74) *Attorney, Agent, or Firm* — Craig J. Lervick; Larkin Hoffman Daly & Lindgren, Ltd.

(57) ABSTRACT

To provide funding mechanisms and alternatives for users while at gaming institutions, a coordinated communication system and mechanism allows for interaction with a virtual bank. This coordination will allow users to potentially request additional credit, or additional fund advances as desired or necessary. Because this request is being carried or handled by a virtual bank, nearly instantaneous credit decisions can be made using existing mechanisms and processes. In the manner much the same as any banking transaction, the financial institution itself with have access to credit information provided by the user, thereby allowing the creation of virtual credit accounts such as instant issue debit cards, or instant issue funds advances. Since the system allows for this secure communication, efficient and effective financial transactions can be easily completed.

10 Claims, 2 Drawing Sheets

(56) References Cited

U.S. PATENT DOCUMENTS

| | | | |
|---|---|---|---|
| 2015/0052045 A1* | 2/2015 | De Luca | G06Q 40/02 |
| | | | 705/39 |
| 2015/0187177 A1 | 7/2015 | Warner et al. | |
| 2015/0243133 A1* | 8/2015 | Nicholas | G07F 17/3237 |
| | | | 463/25 |
| 2015/0302411 A1* | 10/2015 | Bondesen | G06Q 20/3224 |
| | | | 705/72 |
| 2017/0032353 A1 | 2/2017 | Vadivel et al. | |
| 2018/0012202 A1 | 1/2018 | Jimenez et al. | |
| 2018/0047010 A1 | 2/2018 | Itwaru | |
| 2018/0061179 A1* | 3/2018 | Miri | G07F 17/3241 |
| 2018/0211482 A1 | 7/2018 | Richards et al. | |
| 2019/0043307 A1* | 2/2019 | Higgins | G07F 17/3223 |

\* cited by examiner

INSTANT ISSUE DEBIT VEHICLE IN A CASINO ENVIRONMENT

BACKGROUND

Gaming institutions are universally interested in providing convenience for customers, including easy access to financial resources when necessary. Well known sources for funding include ticket windows and cashiers that are placed throughout the gaming institution, ATM's provided at appropriate locations, and institutional financing through the gaming institution itself. One example of this institutional financing will include house accounts, where customers have preexisting arrangements with the gaming institution. In an effort to provide convenience, many gaming machines and cashiers can operate using tickets or vouchers alone, as opposed to requiring cash at all times which can be financed in many ways.

Although financial institutions and gaming institutions have coordinated many resources and practices to provide many conveniences and enhancements for their customers, certain improvements and additional capabilities would be beneficial. More specifically, additional mechanisms to access cash or funds would provide further convenience for users.

Financial institutions are a central part of today's society and play a critical role in the management of finances, both personal and commercial. In many cases, registered financial institutions are federally insured (i.e. FDIC insured, or insured by other government agencies) thus providing stability/security for the world's financial resources and providing confidence for customers.

In a similar manner, financial institutions are highly regulated, and must follow specific rules well established practices. That said, these institutions have become very convenient and provide customers with several tools and resources. Many of these tools/resources allow customers to easily access funds and accounts, thus providing easy mechanisms to coordinate desired transfers and/or payments. As is also well known virtual banks have become mainstream, wherein customers access resources and funds exclusively via online interfaces. Using these mechanisms, funds can be withdrawn from traditional accounts utilizing appropriate tools, accessed via on-line resources, mobile devices, kiosks, etc. That said, multiple security measures are used and specific protocols are followed to insure security of accounts. Other mechanisms used to access accounts include the well-known ATM, which allows users to easily access funds and preform multiple financial transactions. More recently, a tap and pay, or transactions enabled by mobile devices have also emerged as mainstream mechanisms to carry out financial transactions. Examples of these online mechanisms include Android Pay and Apple Pay.

While access to funds has become more convenient, tension still exists when financial resources are provided within casinos and gaming institutions. Naturally, the gaming institutions are interested in providing convenience for their customer, including access to financial resources and accounts. Alternatively, various levels of responsible gaming practices must be observed, thus helping insure that those having gambling problems can be identified and helped where necessary. Although this tension is well recognized, mechanisms and processes can be instituted which help to balance many of these concerns.

Naturally, most gaming machines or gaming devices now provide the ability to receive cash directly at the machine. These machines make use of long established mechanisms for handling coins and/or currency. That said, mechanisms to dispense cash are less common. The expense and undertaking of equipment every gaming machine with mechanisms to both receive and dispense cash is somewhat undesirable. This is one reason paper tickets or printed tickets are commonly used in current day gaming machines. As is well known, these printed tickets can be provided at each machine, and then inserted into other machines, or "cashed out" when the player is no longer interested in continued play.

As is well established and well-known, it is not typical for financial institutions to maintain branches and/or outlets in gaming establishments. Obviously, significant amounts of regulation govern the operation of both casinos and financial institutions. As such, these organizations are often separated, and maintained independently.

In addition to regulation issues, responsible gaming concerns and those seeking to avoid mechanisms which easily facilitate addicted gamblers, or create the possibility of addiction, often suggest that this separation between financial institutions and gaming facilities be further maintained. This provides yet another reason for the separation between financial institutions and casinos.

In the banking industry, it is becoming common to provide instant credit decisions for new applications. In that context, the instant issuance of these decisions often occurs under vigorous guidelines and regulations, requiring these activities to occur in certain ways. For example, it is often necessary to receive and obtain a minimal level of information related to the individual, before a credit decision is provided. Naturally, this information must be treated in a confidential manner, and security is required.

Based on the foregoing issues and concerns, it is desirable to provide a mechanism which could more easily provide resources to casino users. This could include access to funds, and other financial resources.

SUMMARY

To provide increased convenience to players, the system disclosed herein allows for the instant issuance of credit while a user is in a casino environment. In one embodiment, debit cards are issued based upon a newly created financing arrangement or newly created account balances. By appropriately coordinating within a related financial institution, instant credit can also be easily utilized to provide funding for gaming machines. In these situations, the financial institutions (i.e. virtual banks or typical banks) can carry-out their credit approval processes, using well known and accepted mechanisms, and then allow user access to these funds while at the gaming institution using existing payout mechanisms. For example, payout cages, ATM-like payout machines, or dedicated payout terminals could be used for further issuance of these funds or cards. In addition, these financial institutions would be capable of issuing virtual accounts, which also allows users to spend their winnings at many different organizations. In addition, both the virtual accounts and instant issue cards facilitate on-line gaming operations much more conveniently.

BRIEF DESCRIPTION OF THE DRAWINGS

Further details of the various embodiments can be seen from the following description, in conjunction with the drawings, in which.

DESCRIPTION OF THE VARIOUS EMBODIMENTS

Figure 1:
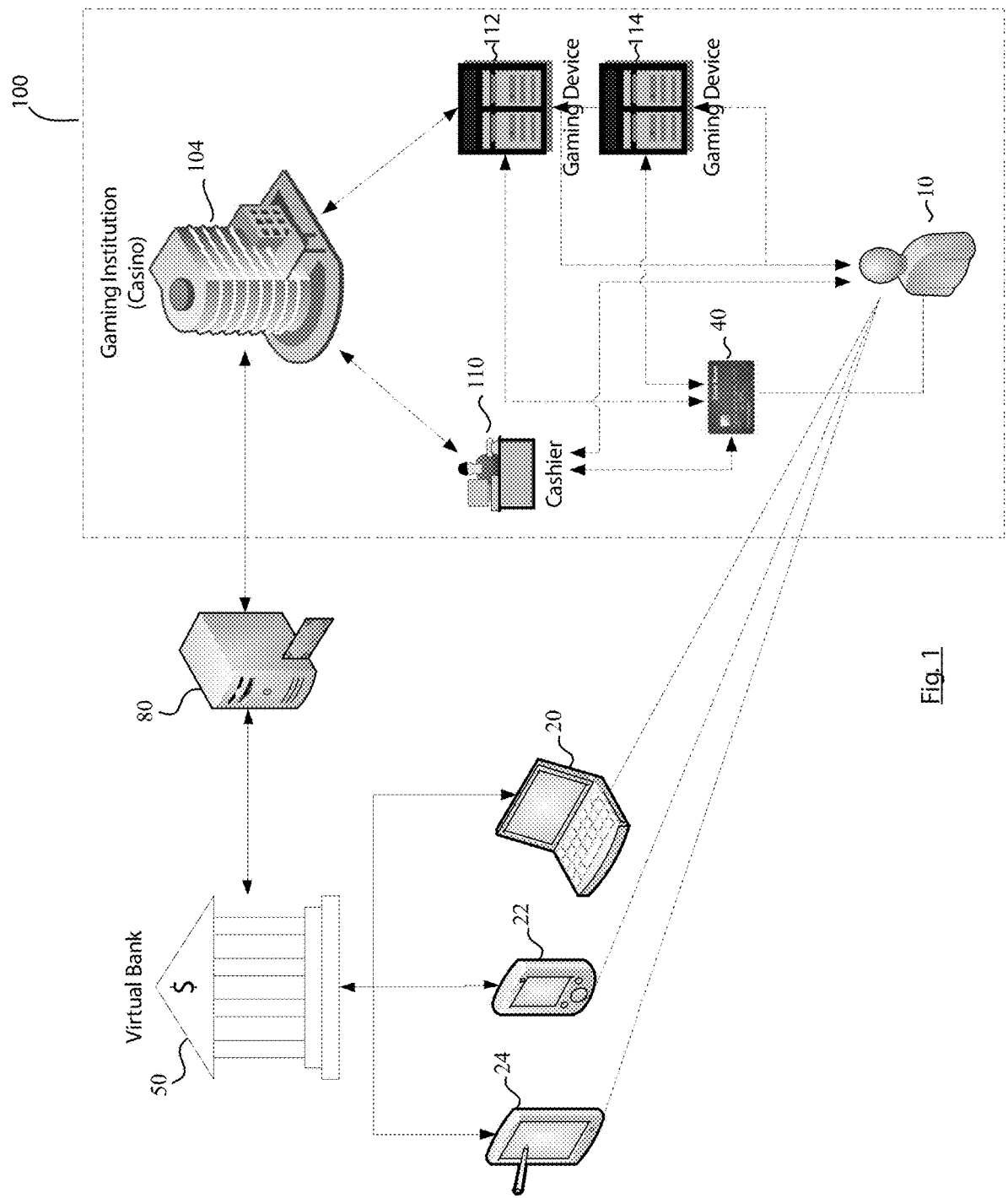
FIG. 1 is a schematic drawing showing the overall configuration of the system carrying out the methods described herein.

In order to provide increased convenience and appeal to players, the system disclosed herein allows for the instant issuance of credit while a user is in a casino environment. In one embodiment, debit cards are then issued based upon a newly created financing arrangement or newly funded account balances. Instant credit can also be easily utilized to provide funding for gaming machines in institutions where this feature is enabled. Financial institutions are able to carry-out their credit approval processes, using well known and accepted mechanisms, and then allow user access to these funds while at the gaming institution. In addition, these institutions would be capable of issuing virtual accounts, which also allows users to spend their winnings at many different organizations. Both the virtual accounts and instant issue cards also facilitate on-line gaming operations much more conveniently.

As mentioned above, appropriate arrangements between the casino itself and a financial organization, along with necessary safeguard make the above-mentioned transactions possible. More specifically, this interaction provides for secure electronic communication between the gaming device, and the banking/financial organization, to receive the necessary confirmations involved. Many mechanisms have been used to provide the necessary security, and those mechanisms are each options for use in carrying out the processes described herein.

In order to provide yet further conveniences to users, a system has been developed wherein a virtual bank will provide traditional operating features such as, allowing user access to cash and funds held within newly created accounts funded by newly approved credit. As part of this process/system, users will create traditional accounts (i.e. savings, checking, money market etc.) which will be maintained at the virtual bank. Since this is an established bank, all benefits of federal backing/insurance are provided, thus providing users with financial security.

In addition to the traditional banking features, the bank access system provides a proprietary interface, allowing users to access accounts while in a gaming environment and/or allowing systems within the gaming institution to coordinate with the virtual bank. It will be recognized that similar accommodations could be created to allow on-line gaming customers to have access to accounts. Clearly, access via an ATM is a well-established mechanism, however the proprietary interface provides yet an additional level of security and coordination when handling funds. This proprietary interface also accommodates additional tools and capabilities. For example, mechanisms could be added to gaming machines, allowing for a tap and pay capabilities. At the moment, these tap and play capabilities are accomplished via several credit accounts. Through the established interface, appropriate levels of security and coordination can be provided so that all necessary requirements are met to allow users to access funds within their traditional accounts via tap and pay mechanisms. More specifically, any requirements related to regulation of funds transfers, and access to certain accounts from a gaming institution are controlled and/or managed. Examples of this may include multilevel validation, voice or fingerprint verification, password schemes, etc.

As yet an additional feature, gaming machines themselves could be programed to provide access to the financially institution interface, thus allowing users to access funds using appropriate user name/password protocols, validation techniques, or other necessary mechanisms. This will provide users with additional tools and capabilities.

In addition to the various features set forth above, it is further beneficial to provide the controlled access to credit opportunities. Using the various safeguards provided, systems are configured to allow users of gaming machines to apply for credit opportunities. More specifically, the coordinated and controlled communication provides the ability to transmit loan or credit applications directly to related financial institutions, thereby providing access to lines of credit, markers, instant issue credit cards etc.

In the financial industry, instant issue credit decisions are well known and well established processes. By establishing appropriate communication techniques and related safety protocols, mechanisms can be provided that allow casino users to submit applications for credit, while within the casino environment. This application process can occur while at a gaming machine itself, or, at other locations. These locations could include ATMs, or dedicated terminals. Once a base line level of information is received, the financial institution will carry out its processes to review the credit application. As is appreciated, this typically involves a review of the applicant's credit history, credit rating/score and other information. Since this information is all readily available, these credits decisions can happen very quickly. Further, since all of this activity occurs on the financial institution side, there is less concern by the gaming institution for data privacy and security.

Once credit decisions are made, appropriate communications can be sent back to the gaming institution, thus allowing credit to be advanced in the most convenient manor possible. This could include funding of virtual accounts, the issuance of an instant issue credit device (i.e. credit or debit card), or the approval of in casino markers. In most situations, the financial institution and the gaming establishment have systems and processes in place to easily handle the activities.

Figure 2:
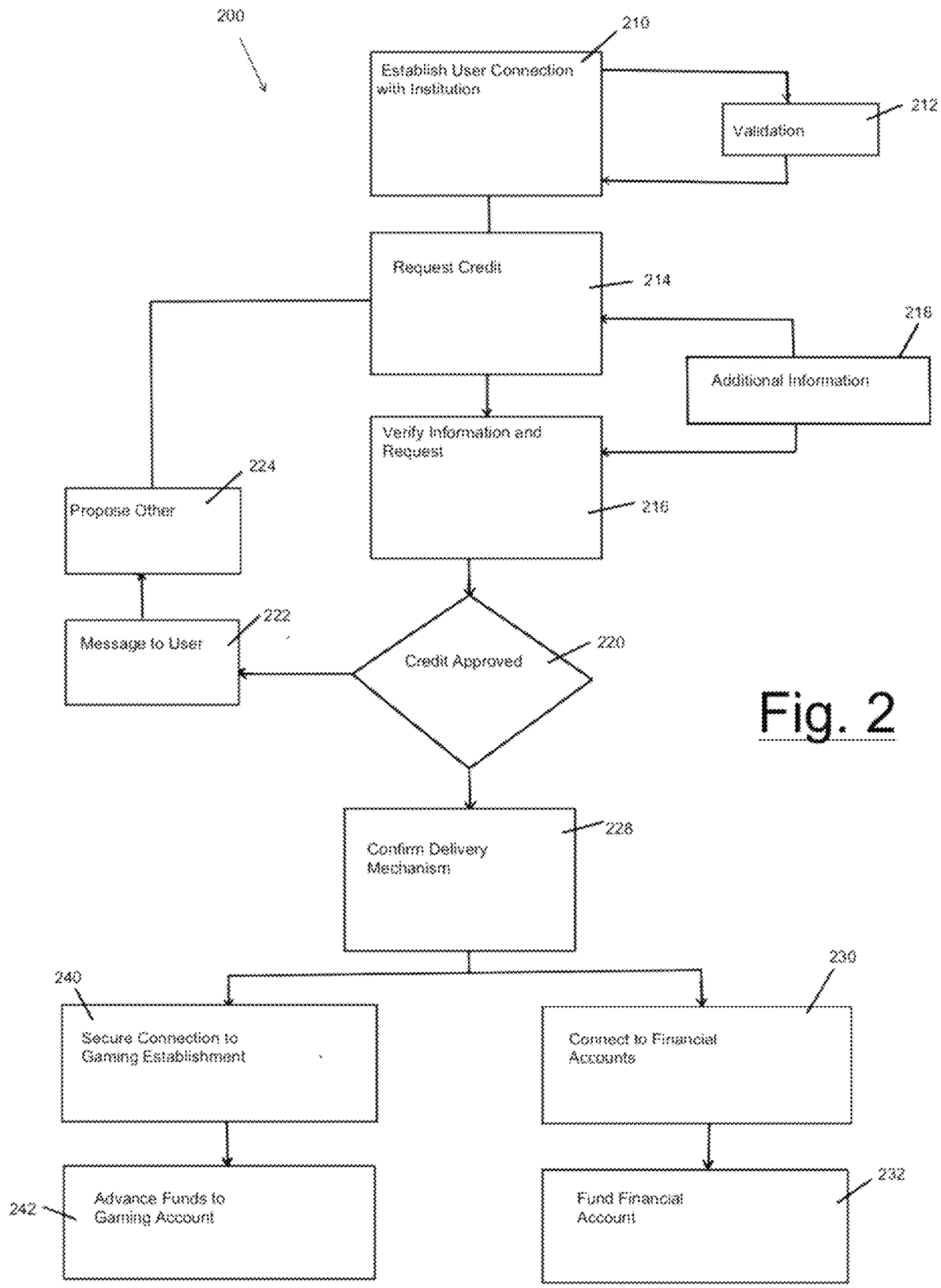
FIG. 2 is a flow chart outlining details of the credit approval process.

FIG. 2 illustrates one example process followed by a user when carrying out the credit request process. As illustrated, an initial step involves a user establishing a connection with a financial institution at step 210. Depending upon the connection process, a validation step 212 may be required, such as a password verification or multilevel verification. Next, at step 214 a user will request credit. This may be in many forms, including a request to advance funds to an additional and existing financial account, or the opening of a new credit vehicle, such as a credit card. Upon this request, the financial institution will verify the information and request, and could potentially follow-up with a request for additional information.

Next, the financial institution will make their credit decision based on the information received. In this case, the financial institution will then communicate whether credit has been approved, or not. If the credit application has been denied for some reason, a message is sent to the user at step 222, communicating this decision, and at step 224 potentially proposing alternative options. This would then allow a user to possibly re-submit their request for credit at step 214 or pursue alternative credit vehicles or financing options.

If the financial institution approves the credit request, the process will move to a delivery process at step 228. Here multiple options are possible, potentially including an advance to an existing financial account, or an advancement to an account within the gaming institution. More specifically, at step 230 the system will appropriately create connections to the users financial accounts and subsequently fund that account at step 232. Again, this could simply include a funds transfer within the financial institution, i.e. a transfer to existing user accounts. It may also include an advance to existing credit accounts, such as debit cards, etc. Alternatively, this contemplates the creation of additional credit accounts such as credit cards, debit cards, virtual payment mechanisms, etc. This specifically includes existing payment options such as Paypal, Apple Pay, Google Pay, etc. Alternatively, the financial institution at step 240 may create a secure connection to the gaming establishment, and at step 242 advance funds to gaming accounts held by and managed at the gaming establishment.

As will be appreciated, FIG. 2 illustrates one embodiment of the credit application and approval process involved. Those skilled in the art will recognize that certain variations are possible.

In addition to the communication and coordination, the funding mechanisms can coordinate with existing player tracking or player rewards accounts. Obviously, the casinos maintain certain levels of information about those enrolled in these programs. This information coupled with winning tickets will typically allow for the instant issuance of the contemplated debit vehicle. It is completed that the debit vehicle will be a MasterCard® debit card, however cards backed by Visa® or Discover® are also contemplated.

As will be appreciated, because coordination is carried out by a financial institution, this also allows for use of the above mentioned credit mechanisms. Again, account holders will have access to virtual accounts while in the casino environment, and also have the ability to apply for third party credit. In these circumstances, credit could be provided in the form of funds transferred into virtual accounts, loans, markers provided by the gaming institution, etc. Due to the connection and communication capabilities outlined above, the financial institution is able to provide credit decision in a nearly instantaneous fashion. Once a determination is made, a transfer of funds can be achieved via various vehicles including instant transfer to the user's accounts at the virtual bank. In addition, the financial institution could provide an instant issue virtual debit card, an instant issue funds transfer, a prepaid card, crypto currency, etc.

As mentioned above, the systems and methods described above allow easy access to user accounts while at a casino or gaming institution. Turning now to FIG. 1, this system is generally illustrated. As mentioned, the system involves the coordination and secure communication of necessary signals to allow a user 10 to access funds and accounts that are maintained at a virtual bank 50, while user 10 is at a gaming institution or casino 100.

In the present systems, virtual bank 50 meets all the traditional requirements of banking and financial institutions, including satisfying FDIC insurance requirements and instituting related protections for financial accounts. Certain examples of these banking characteristics include the ability to offer well known banking services such as savings accounts, checking accounts, money market accounts, investment accounts etc. Further, financial institution 50 could accommodate filing and loan applications, for loans provided by the virtual bank itself, or third party lenders. As is also well known, banking institutions (either "virtual" or "bricks and mortar banks") allow access via many financial different mechanisms. As illustrated in FIG. 1, user 10 can access virtual bank 50 using a typical computer 20, a PDA or mobile device 22, or a tablet computer 24. Naturally, other alternatives exist including kiosks, ATMs etc. Using appropriate software installed on these devices, or appropriate interfaces which incorporate security measures, user 10 is allowed access to all accounts and financial resources maintained at financial institution 50.

In some cases, the above referenced mechanisms which allow access to accounts is inappropriate or inefficient. For example, a user may not have appropriate computing devices (i.e. mobile phones or mobile devices) with them, or may not have internet access. Should this occur while at a gaming institution 100, the system has specific accommodation to deal with the situations and provide resources for user 10.

While at gaming institution 100, user 10 typically has access to a cashier 110 and multiple gaming devices 112, 114. Through these direct interfaces, the user has the opportunity to interact with the resources and capabilities provided by these services/devices. Naturally, cashier 110 will have access to institutional resources and/or systems contained within the gaming institution itself, which is conceptually illustrated as a gaming facility 104. Similarly, gaming device 112 and gaming device 114 will also have access to casino systems which are again conceptually illustrated as being part of gaming facility 104. As also illustrated in FIG. 1, user 10 typically has various financial cards including a bank card 40. This card could include a typical credit card, or could include various access cards such as loyalty cards, membership cards, etc. In the illustrated embodiment, card 40 will provide access to funds via cashier 110. Card 40 may also provide access or an interface on or within gaming devices 112 and 114. However, it is well recognized that credit and financial cards are typically not accepted at gaming devices themselves, thus the present systems and devices provides further accommodations.

Although not specifically illustrated in FIG. 1, a user may use a combination of mechanisms within the casino along a mobile device 22 to gain access to accounts at virtual bank 50. For example, gaming devices 112 and 114 may include a unique code (e.g. a proprietary number code, a 2D bar code or a QR code) which is recognized by an appropriate app installed on the mobile device 22. When the unique code is entered or scanned, appropriate communication is initiated to confirm the identity of the user, their location, and the existence of related accounts at virtual bank. Once appropriately linked, the user would be able to transfer funds between gaming devices 112 and 114, and virtual bank 50 as desired. Various security protocols are contemplated, which could include the use of confirmation codes, verification messages, or encrypted communication between devices. In a similar manner, codes (e.g. a proprietary number code, a 2D bar code or a QR code) could be used to exchange funds between virtual bank 50 and game tables, slot machines, game control modules, POS devices, ticket in/ticket out devices, ATMs, financial kiosks, and any other devices capable of electronic funds handling. It should be recognized that these mechanisms allow money to be transferred both to and from virtual account. In one specific example, a user will be able to use the same unique codes mentioned above to transfer winnings back to their virtual account.

In yet another example, and as suggested above, once the user has established the appropriate connections to the gaming systems and virtual bank, the use of ticket-in/ticket-out functionality is made available. Further, a user may be allowed to scan ticket-in/ticket-out tickets as a starting point for further funds transfers. In this example, when at a gaming institution the user could establish appropriate links with the financial institution to enable financial transactions as generally outlined above. One example could involve scanning of an appropriate code at the gaming institution with a mobile device, which again confirms the identity of the user, their location (i.e. which gaming institution they are at and which section of that gaming institution), and the existence of related accounts at the virtual bank. This may involve scanning a barcode or QR code at a gaming machine, or a central location within the gaming institution. These steps would then establish a link between the virtual bank and the systems at the gaming institution. Alternatively, a user may requests a link using log-in mechanisms provided by the gaming institution (e.g. user name, passwords, and confirmation codes), or, the functionality could be enabled by appropriate Apps installed on a mobile device. Once these links are established and appropriate security protocols are in place, a user could then use ticket-in/ticket-out machines to transfer funds, or, the user themselves could scan the ticket-in/ticket-out tickets themselves, thus allowing funds to be transferred from the gaming institution to the virtual bank. This again could be enabled by barcodes, QR codes or other unique identifier on the tickets themselves, which verify the validity of the ticket, and the gaming institution from which it was issued. Once scanned, funds would transfer to the user's accounts automatically.

As also shown in FIG. 1, the illustrated system includes a financial server 80 which accommodates communication between virtual bank 50 and gaming institution 100 (or gaming facility 104). Those skilled in the art will recognize that, financial server 80 could be located within gaming institution 100, at a remote location, housed within a data center, or be a virtual component managed as part of a data center or housed within "the cloud". Financial server 80 provides several functions and features which allows for particular communication and accommodations to take place. Generally speaking, this involves coordination between virtual bank 50 and gaming institution 100 so that account access is possible. As one example transaction, user 10 may attempt to interface with gaming device 112 using financial card 40 in order to access funds. In this situation, both gaming device 12, and gaming institution 100 include specific accommodations which allow information from card 40 to be transmitted to financial server 80 in a predetermined manner.

Financial server 80 will include specific security measures, and necessary protocols to verify the communication is accurate, and forward the appropriate request to virtual bank 50. Based upon this communication and appropriate protocols, access to funds at virtual bank 50 can be requested and if appropriate approved. In response, virtual bank 50 will communicate with financial server 80 thus providing additional mechanisms allowing funds to be provided to user 10 as desired. In addition to card 40, other mechanisms could be used to access funds so long as there is an ability to identify the account holder, and provide necessary levels of security. Some of these mechanisms could include player tracking cards, biometrics readers, mobile devices (as generally discussed above) and other specially designed devices which allow for the secure identification of the account holder, (e.g. wrist watch with specially designed transmitter, etc.)

In addition to the various details listed above, the communication techniques and security protocol also allow users to remotely access virtual bank 50 to seek additional credit lines or borrowing mechanisms. As mentioned above, instant issue credit decisions are very well accepted and common in today's society, thus these same tools and mechanisms should be/could be available to casino users. In this particular embodiment, user 10 could initiate such a request from gaming device 112. In these circumstances this quest request will be appropriately transmitted through gaming institution mechanisms, and eventually provided to virtual bank 50 so this loan transaction could occur. Assuming the quest is approved, appropriate funds could then be provided to the user in any of the mechanisms outlined above.

As suggested above, the system described could allow many types of transactions. In many cases, this will allow access to existing accounts at virtual bank 50, but may also include loan requests, or requests for extension of credit. At this point, virtual bank 50 could handle these as desired including transmission to third party credit institutions, or other third party lenders. Based upon these applications, new funds can be made available to user 10.

The illustration above shows user 10 gaining access to various accounts using financial card 40. It will be understood and recognized that many types of mechanisms could be utilized to achieve this function, including a virtual wallet or e-wallet, or mobile devices having direct pay capabilities. Further, financial cards having "tap and pay" capabilities are also contemplated, as are other electronic devices such as smart watches, smart keys etc.

The foregoing description is presented to enable one of ordinary skill in the art to make and use the invention and is provided in the context of a patent application and its requirements. Modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

What is claimed is:

1. A system for providing a user of a gaming device within a gaming institution the ability to play a casino game and to apply for, obtain and access a new instant access credit account provided by a virtual bank from the gaming device, comprising:

a user interface having a display screen and a user input device, the user interface incorporated into a gaming device having a gaming device controller therein, wherein the gaming device controller is configured to present a gaming display on the display screen which will allow the user to play a casino game having financial wagers and also configured to present a credit access display in response to a predetermined user input action, wherein the credit access display allows a user to use the user input device and the display screen to generate a request to open the new instant access credit account with the virtual bank, wherein the virtual bank is independent and not managed by the gaming institution, and wherein the request will include user information;

a communication system within the gaming institution coupled to the gaming device controller and configured to receive the request generated by the user via the credit access display, and to securely transmit the request;

a user mobile device having a financial access app installed thereon, the user mobile device configured to allow mobile communication and having a mobile user interface to provide user interface capabilities;

a virtual bank processing system in communication with the communication system to accommodate secure receipt of the request, the communication system and the virtual bank processing system further configured to complete an verification process by sending an information request to the communication system which prompts the user to enter verification information by generating a request upon the user interface of the gaming device or the mobile user interface which instructs the user to carry out a verification process, wherein the virtual bank processing system is configured to receive verification information from the user via the user interface or the user mobile device, wherein the verification information received via the user interface will then subsequently be securely transmitted to the bank processing system via the communication system, or wherein the verification information received via the user mobile device will the subsequently be securely transmitted to the bank processing system via the user mobile device, wherein the virtual bank processing system comprises a processor and instructions configured to allow processing of the user information and the request for instant credit and the automated generation of an instant credit decision in a nearly instantaneous manner for transmission to the user via the communication system and the user interface, wherein the instant credit decision will comprise a denial or an approval of credit to be issued by the virtual bank, and wherein the approval will further comprise the instant issuance of credit to the user and the creation of a user credit account maintained by the virtual bank;

wherein, upon approval of the request, the virtual bank processing system will initiate a second verification process which comprises transmitting a first information request to the communication system seeking a first additional user input by causing a request image to be presented to the user on the user interface and transmitting a second information request to the user mobile device seeking a second additional user input to be provided via the financial access app installed on the user mobile device, wherein the financial access app will cause a graphical display presenting the second information request upon the mobile user interface, wherein upon receipt of additional information from both the user interface and the user mobile device which satisfy a predetermined set of verification protocols the virtual bank processing system will generate an access message including information to allow the user to access the user credit account, wherein the second verification process comprises the virtual bank verifying that a location of the user is located within the gaming institution, as confirmed via the second additional user input received from the user's mobile device, and wherein the second additional user input comprises using either a location indicator provided by the user mobile device or receiving a code generated by user mobile device indicative of a location within the gaming institution; and a funding system within the gaming device configured to receive the access message from the virtual banking system via the communication system, wherein the funding system will automatically allow the user to access and use the user credit account provided by the virtual bank for wagering at gaming device and at other locations within the gaming institution upon receipt of the access message by presenting an access screen to the user on the user interface or the mobile user interface and completing a user confirmation process using the access screen.

2. The system of claim 1 wherein the code is generated by one of entering a number code, scanning a bar code, scanning a QR code or scanning a unique symbol.

3. The system of claim 2 wherein the funding system will provide a gaming credit on the gaming device for use by the user while continuing to use the gaming device, the gaming credit based upon the user credit account.

4. The system of claim 1 wherein the second additional user input received from the user's mobile device comprises generating the code by one of entering a number code, scanning a bar code, scanning a QR code or scanning a unique symbol, wherein the number code, bar code, QR code or unique symbol is presented on the user interface of the gaming device, and the code is transmitted via the user's mobile device.

5. The system of claim 1 wherein the second additional user input received from the user's mobile device comprises generating the code by one of entering a number code, scanning a bar code, scanning a QR code or scanning a unique symbol, wherein the number code, bar code, QR code or unique symbol is permanently posted at the gaming institution at a location in close proximity to the gaming device, and the code is transmitted via the user's mobile device.

6. A method of providing a user of a gaming device within a gaming institution with the ability to play a casino game and to apply for, obtain and access a new instant access credit account provided by a virtual bank while using the gaming device, comprising:

receiving a request to open the new instant access credit account via a user interface incorporated into the gaming device, the user interface having a display screen and a user input device controlled by a controller to present a gaming display which will allow the user to play a casino game involving wagers and configured to present a credit access display in response to a predetermined user action, wherein credit access display allow a user in us the user input de od the display screen to allow a user to provide user information which will be contained within the request;

a communication system within the gaming institution receiving the request generated from the user interfacing with the credit access display of the gaming device;

securely receiving the request by a virtual bank processing system in communication with the communication system, completing a verification process carried out by the virtual bank processing system using communication with the communication system or a user mobile device, comprising the transmission of an information request from the virtual bank processing system to the communication system and the gaming device thus presenting a verification interface on the user interface which will prompt the user to enter verification information using the user interface or the transmission of the information request to the user mobile device thus causing a verification interface to be presented on a mobile user interface of the user mobile device which will prompt the user to enter the verification information using the user mobile device using the mobile user interface, wherein the verification information will then subsequently be securely transmitted to the virtual bank processing system;

the virtual bank processing system processing the request for instant credit and generating an instant credit decision for transmission to the user via the communication system and the user interface, wherein the instant credit decision will comprise a denial or an approval of credit to be issued by the virtual bank in a nearly instantaneous manner, and wherein the approval will further comprise the instant issuance of credit to the user and the creation of a user credit account maintained by the virtual bank;

wherein, upon approval of the request, the virtual bank processing system initiating a second verification process which comprises transmitting a first information request to the communication system which causes a second verification process to be presented on the user interface seeking a first additional user input via the user interface and transmitting a second information request to a user's mobile device seeking a second additional user input to be provided via a financial access app installed on the user's mobile device, wherein the financial access app will cause a mobile verification process to be presented on the mobile user interface of the mobile device allowing the user to generate the second additional user input, wherein upon receipt of the additional information from both the user interface and the user's mobile device which satisfy a predetermined set of verification protocols the virtual bank processing system generating an access message including information to allow the user to access the user credit account, wherein the second verification process comprises the virtual bank verifying that a location of the user is located within the gaming institution, as confirmed via the second additional user input received from the user's mobile device, and wherein the second additional user input comprises using either a location indicator provided by the user's mobile device or receiving a code generated by the user's mobile device indicative of a location within the gaming institution; and a funding system within the gaming device receiving the access message from the virtual banking system via the communication system, and automatically allowing the user to access and use the user credit account provided by the virtual bank for wagering at the gaming der and at other locations within the gaming institution upon receipt of the access message by presenting an access screen to the user on the user interface or the mobile user interface and the user completing a user confirmation process on the access screen.

7. The method of claim 6 wherein the code is generated by one of entering a number code, scanning a bar code, scanning a QR code or scanning a unique symbol.

8. The method of claim 7 wherein the funding system will provide a gaming credit on the gaming device for use by the user while continuing to use the gaming device, the gaming credit based upon the user credit account.

9. The method of claim 6 wherein the second additional user input received from the user's mobile device comprises generating the code by one of entering a number code, scanning a bar code, scanning a QR code or scanning a unique symbol, wherein the number code, bar code, QR code or unique symbol is presented on the user interface of the gaming device, and the code is transmitted via the user's mobile device.

10. The method of claim 6 wherein the second additional user input received from the user's mobile device comprises generating the code by one of entering a number code, scanning a bar code, scanning a QR code or scanning a unique symbol, wherein the number code, bar code, QR code or unique symbol is permanently posted at the gaming institution at a location in close proximity to the gaming device, and the code is transmitted via the user's mobile device, and the code is transmitted via the user's mobile device.

* * * * *